United States Patent [19]

Deike et al.

[11] Patent Number: 4,915,458
[45] Date of Patent: Apr. 10, 1990

[54] RELAY VALVE APPARATUS

[75] Inventors: Karl-Heinz Deike, Pattensen; Bernd Kiel, Wunstorf, both of Fed. Rep. of Germany

[73] Assignee: WABCO Westinghouse Fahrzeugbremsen GmbH

[21] Appl. No.: 271,548

[22] Filed: Nov. 15, 1988

[30] Foreign Application Priority Data

Dec. 10, 1987 [DE] Fed. Rep. of Germany ....... 3741790

[51] Int. Cl.$^4$ .......................... B60T 15/02; B60T 8/38
[52] U.S. Cl. ...................................... 303/40; 303/118; 137/627.5
[58] Field of Search ................. 303/40, 52, 68, 75, 303/7, 118; 188/181 A, 152; 137/627.5

[56] References Cited

U.S. PATENT DOCUMENTS

| | | |
|---|---|---|
| 2,617,261 | 11/1952 | Ringer . |
| 2,705,402 | 4/1955 | Stelzer . |
| 3,326,239 | 6/1967 | Saint-Joanis et al. . |
| 3,482,485 | 12/1969 | Abbott . |
| 3,858,610 | 1/1975 | Klimek ............................ 137/627.5 |
| 3,918,767 | 11/1975 | Reinecke ............................ 303/68 |
| 3,941,432 | 3/1976 | Blanz ................................ 303/68 |
| 4,145,091 | 3/1979 | Bueler et al. ...................... 303/118 |
| 4,482,191 | 11/1984 | Beck et al. ........................ 303/52 |

FOREIGN PATENT DOCUMENTS

| | | |
|---|---|---|
| 1530722 | 2/1969 | Fed. Rep. of Germany . |
| 1943753 | 3/1971 | Fed. Rep. of Germany ... 137/627.5 |
| 2345641 | 1/1977 | Fed. Rep. of Germany . |
| 3123869 | 3/1982 | Fed. Rep. of Germany . |
| 8703884 | 6/1987 | Fed. Rep. of Germany . |
| 1040379 | 8/1966 | United Kingdom . |
| 2027173 | 2/1980 | United Kingdom ........... 137/627.52 |
| 2121496 | 12/1983 | United Kingdom .................. 303/52 |

OTHER PUBLICATIONS

"Graubremse Ausgabe IAA 1987", Graubremse Co., Sep. 1987.

Primary Examiner—Andres Kashnikow
Assistant Examiner—Timothy Newholm
Attorney, Agent, or Firm—Horst M. Kasper

[57] ABSTRACT

A relay valve apparatus having two relay valves are located in a single housing with their longitudinal axes parallel to one another. The two relay valves each include a double seat valve and a relay piston. The two relay valves are located one behind the other in the direction along their longitudinal axes so that the two double seat valves are located between the relay pistons. An outlet chamber of the first double seat valve and an outlet chamber of a second double seat valve empty into a common fluid pressure outlet leading to the atmosphere.

18 Claims, 1 Drawing Sheet

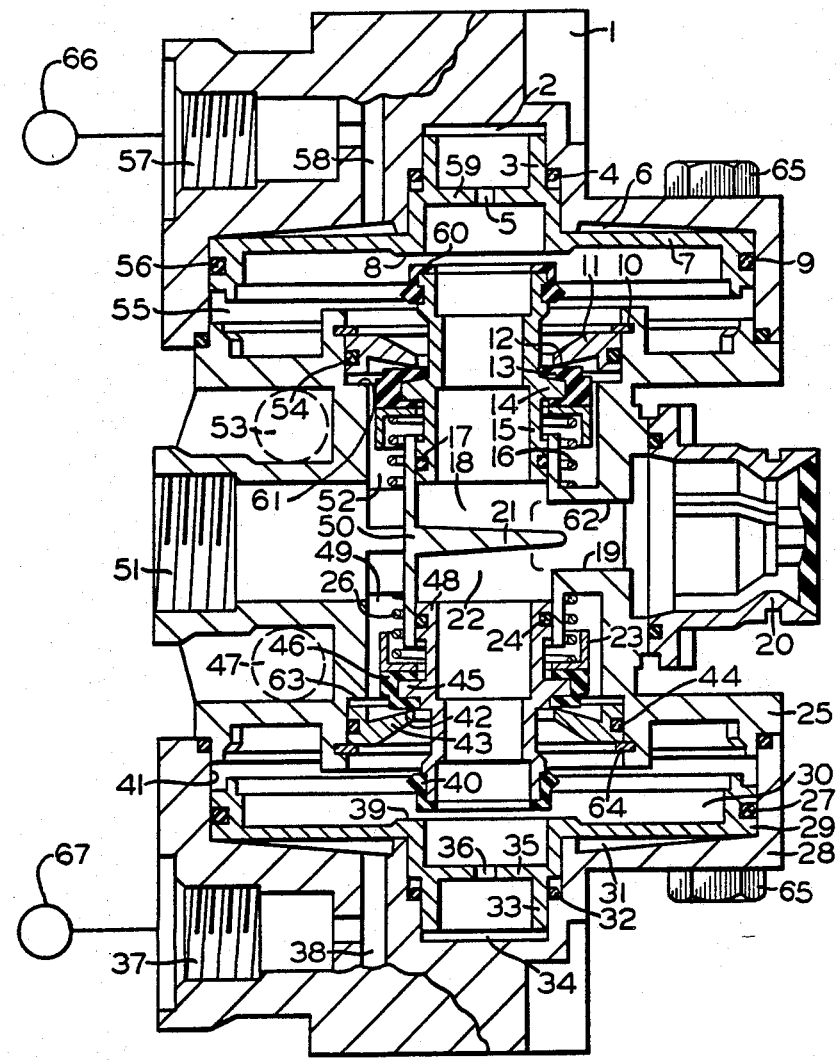

RELAY VALVE APPARATUS

FIELD OF THE INVENTION

This invention relates to a relay valve apparatus for an anti-locking regulation equipment for vehicle brake units and, in particular, to a relay valve arrangement having a first and a second relay valve located in a single housing with their longitudinal axes in line with each other, with each relay valve including a double seat valve and a relay piston in which the relay valves are located one behind the other in the direction along their longitudinal axes so that the double seat valves are situated between the relay pistons and wherein the double seat valves have outlet chambers which empty into a common fluid pressure outlet leading to the atmosphere.

BACKGROUND OF THE INVENTION

One type of a relay valve apparatus well known in the prior art is described in a brochure published by the Graubremse Company, "Graubremse Ausgabe IAA 1987", Page 8.

The disclosed relay valve apparatus, which is described in this brochure, includes two relay valves located in a housing with their longitudinal axes parallel to one another so that the fluid pressure inlet chambers of the relay valve are connected by means of a common pressure connection with a fluid pressure source. In the same housing, there are additional valve mechanisms to influence the control pressure.

The prior art relay valve apparatus requires a special and relatively complex housing structure which is expensive to manufacture and difficult to maintain.

OBJECTS AND SUMMARY OF THE INVENTION

Accordingly, it is an object of this invention to create a relay valve apparatus of the type described above which is simple and inexpensive to construct and maintain.

A further object of the invention is to provide a new and improved relay valve arrangement.

Further, this invention offers the particular advantage, on account of the particular arrangement of the valves and relay piston in relation to one another which is one behind the other viewed in the direction of the longitudinal axis of the valves, and on account of the movement directions of the valves and the relay piston which are opposite to one another, so that it allows the use of significant components of commercially available relay valves, e. g., housing cover and relay piston are identical. In addition, on account of the particular arrangement of the valves in relation to one another, it is possible with simple means to provide a common connection leading to the atmosphere for the fluid pressure outlet of the first relay valve and the fluid pressure outlet of the second relay valve, which achieves the advantage of reducing the noise of two relay valves with only a single noise damper.

In accordance with the present invention, there is provided a relay valve apparatus for use in an anti-lock regulation system for vehicle brake units comprising, a first double seat valve having a first inlet valve for establishing communication of a first working chamber with a fluid pressure input chamber and having a first outlet valve for establishing communication of the first working chamber with a first outlet chamber which is in communication with the atmosphere, the first double seat valve having a first relay piston which can be pressurized with a control pressure, and the second double seat valve having a second inlet valve for establishing communication of a second working chamber with a fluid pressure input chamber and having a second outlet valve for establishing communication of the second working chamber with a second outlet chamber which is in communication with the atmosphere, the second double seat valve having a second relay piston which can be pressurized with a control pressure, the first and second double seat valves and the relay pistons are located one behind the other in the direction of their longitudinal axes so that the first and second double seat valves are located between the relay pistons, the first outlet chamber of the first double seat valve and the second outlet chamber of the second double seat valve empty into a common pressure outlet passage leading to the atmosphere.

DESCRIPTION OF THE DRAWINGS

The above objects and other attendant features and advantages will be more readily appreciated as the present invention becomes better understood by reference to the following detailed description when considered in conjunction with the accompanying drawings, wherein:

The single FIGURE shows a relay valve apparatus constructed as a double relay valve whereby the valves and relay piston, seen in the direction of the longitudinal axis of the valves, are arranged one behind the other.

DETAILED DESCRIPTION OF THE INVENTION

Referring now to the single FIGURE of the drawing, there is shown a double relay valve having a housing 25 which is open on its ends facing oppositely away from one another. As shown, two housing end covers 1 and 28 are attached by bolts 65 to the housing 25 to close the two respective ends of the housing 25.

It will be seen that there is a graduated housing located in the first housing end cover 1. A first movable relay piston 7 is situated and installed in the graduated housing recess 56 and is sealed by means of a sealing ring 9. The first relay piston 7 is located between a first control chamber 6 and a first working chamber 55 and is pressure-sealed therefrom. On the upper side away from the first working chamber 55, the first relay piston 7 has an annular extension 3, which slidably fits into the smaller diameter portion of the graduated housing recess 56 and is guided therein. A sealing ring 4 surrounds the outer circumference of the annular extension 3 and is in intimate contact with the adjacent wall of the graduated housing recess 56. Thus, there is not a fluid connection between the first control chamber 6 and a chamber 2, which is a wall or partition 59 provided in the annular extension 3. The wall 59 has an opening 5 which operates as a throttle so that the first working chamber 55 and the chamber 2 are connected to one another.

As shown, a first control connection 57 is formed in the first housing end cover 1 and a communication channel 58 connected to it. Thus, the first control chamber 6 is placed in communication with a first source of fluid control pressure 66.

As noted above, the first housing end cover 1 is suitably connected to the upper or top side of the housing 25 by bolts 65.

On the side facing the first relay piston 7 and bordering the first working chamber 55, the housing 25 is provided with a first pressure outlet 53 which is connected with a consumer, e. g., a brake cylinder (not shown). A graduated housing recess 56 is formed in the housing 25, and a first housing insert 11 is located therein facing the first housing cover 1. That is, the first housing insert 11 is inserted in the graduated housing recess 56 and is in contact with a graduation or step 61. The first housing insert 11 is sealed in this part of the graduated housing recess 56 by means of a sealing ring 54 and is held in place by means of a retaining ring 10. The first housing insert 11 is essentially designed as an annular body and has formed on the underside away from the first working chamber 55 a double valve seat 12.

A tubular-shaped body 15 extends through the first housing insert 11 and is oriented so that it can move in the direction along the longitudinal axis of the housing. As shown, there is a tube 50, preferably designed as a tube located in the housing 25, which is designed to move in the direction of the longitudinal axis of the housing 25, and which is preferably designed as one piece in the housing 25. The tubular body 15 is effectively sealed by means of a sealing ring 17 located around its circumference in the tube 50. Thus, the first tubular body 15 can move in the direction of the longitudinal axis of the tube 50. On the circumference of the first tubular body 15, there is an annular ledge or projection which runs radially outward which serves as a support for a sealing ring 13. The first tubular body 15 is loaded by a spring 16 which is caged in the housing 25. The spring 16 biases toward the first tubular body 15 and double valve seat 12 so that the sealing ring 13 contacts the double valve seat 12. Thus, the double valve seat 12 and the sealing ring 13 form an inlet valve 12, 13.

The upper end of the first tubular body 15 extends or projects into the first working chamber 55. A sealing portion 60 which is carried by a tubular body 15 and a valve seat 8 which is located on the first relay piston 7 form an outlet valve 60, 8. The combined inlet/outlet valves 12,13 / 60,8 formed in this manner represent a first double seat valve 12,13 / 60,8 of the relay valve apparatus. Thus, the first working chamber 55 can be put into communication with a sectional chamber 52 of a pressure input chamber via the first double seat valve 12,13 / 60,8, and also can be placed in communication with a sectional chamber 18 of an outlet chamber which is established by the inner wall of the tube 50.

The fluid pressure input chambers 52, 49 consist of a sectional chamber 52 and another sectional chamber 49. The input chambers 52, 49 are placed in communication with a fluid pressure source via a pressure connection which is located on the housing 25 and, in turn, to a fluid pressure inlet 51. The outlet chamber 18, 22 consists of a sectional chamber 18 and another sectional chamber 22 and is limited by the inner wall of the tube 50. The tube 50 is in communication with or exhausted to the atmosphere by means of a passage 62 which is located in the wall of the tube 50. The passage 62 is connected to fluid pressure outlet 19 formed in the wall of the housing 25. A connection tube 20 is connected to the fluid pressure outlet 19. A noise damper or suppressor (not shown) may be mounted on the remote end of the connection tube 20.

As shown, a second housing insert 43 is substantially identical to the first housing insert 11 and is located in the lower end of housing 25. The first housing insert 11 is also an annular-shaped body which is sealed around its circumference by a sealing ring 54 which intimately contacts the first graduated housing recess 56 of the housing 25. The upper annular edge of the first housing insert 11 is in contact with a graduation or step formed in the recess of housing 25. The first housing insert 11 is fastened or retained in the housing 25 by means of a retaining ring 10. The assembly of the second housing insert 43 is installed from the outside of the graduated housing recess 41 of the housing 25, which is the opposite side of the housing 25 away from the first housing end cover 1. The second housing insert 43 is fastened or retained in the housing 25 by means of a retaining ring 64.

As noted above, the second housing insert 43 is symmetrical to the first housing insert 11, and is also located in the housing 25.

The second housing end cover 28 is also provided with a graduated housing recess 41 in which is positioned a movable second relay piston 29. A sealing ring 27 is situated between the circumference of piston 29 and the wall of the graduated housing recess 41. The second relay piston 29 separates a second control chamber 31 in a pressure-tight manner from a second working chamber 30. On the side away from the second working chamber 30, the second relay piston 29 has an annular extension 33 which projects into a smaller diameter portion of the graduated housing recess 41, and which is guided in relation thereto. A sealing ring 32 surrounds the annular extension 33 and is in tight fit with the wall of the graduated housing recess 41. The sealing ring 32 prevents any fluid communication between the second control chamber 31 and a chamber 34. A dividing wall 35 has a hole 36 which acts in the manner of a throttle, and which connects the second working chamber 30 to the chamber 34.

As shown, a second control connection 37 is formed on the second housing end cover 28, and a fluid passage 38 is connected to the second control connection 37. Thus, the second control chamber 31 is placed in communication with a second control fluid pressure source 67.

The second working chamber 30 can be placed in communication with a consumer, e. g., a brake cylinder (not shown), by means of a second fluid pressure outlet 47 formed in the housing 25.

As noted above, the second housing insert 43 is essentially an annular body which has on the side facing away from the second working chamber 30, a double valve seat 42. A tappet-like second tubular body 48 projects through the second housing insert 43. The second tubular body 48 can move in the direction of the longitudinal axis of the second housing insert 43. The second tubular body 48 is sealed by a sealing ring 24 located on its circumference and the tube 50. Accordingly, the second tubular body 48 can move in a guided fashion in the direction of the longitudinal axis of the tube 50.

The second tubular body 48 has an annular projection 45 extending outward in the radial direction, which serves as the support for a sealing ring 46. The second tubular body 48 is urged in the direction of the double valve seat 42 by a compression spring 26 which is caged in the housing 25. Thus, the sealing ring 46 is normally in contact with the double valve seat 42. The double valve seat 42 and the sealing ring 46 form an inlet valve 42, 46. On the end of the tubular body 48 projecting into the second working chamber 30, there is another sealing 40. A double valve seat 39 is located on the second relay piston 29 which cooperates with the sealing ring 40 to form an outlet valve 39, 40. The combined inlet/outlet valves 42,46 / 39,40 formed in this manner represent a second double seat valve 42,46 / 39,40 of the relay valve apparatus. Thus, the second working chamber 30 can be selectively placed in communication either with the sectional chamber 49 of the fluid pressure inlet chamber 52, 49 or with the sectional chamber 22 of the outlet chamber 18, 22 established by the inner wall of the tube 50.

As noted above, the outlet chamber 18, 22 is circumscribed by the tube 50.

The fluid pressure inlet chamber 52, 49 is defined by the outer peripheral surface of the tube 50 and by the outer peripheral surface of the first tubular body 15 which carries the sealing rings 13, 60, and the peripheral surface of the second tubular body 48 which carries the sealing rings 46, 40 so that the fluid pressure input chambers 52, 49 each take the form of an annular chamber.

It will be appreciated that on the inner wall of the tube 50, which is located between the adjacent sides of the two tubular bodies 15 and 48, there is a baffle plate or deflector 21 which extends essentially transverse to the longitudinal axis of the tubes toward the fluid pressure outlet 19. Thus, the baffle plate or deflector 21 divides the outlet chambers 18, 22 into the two sectional chambers 18 and 22. Accordingly, each of the sectional chambers 18 and 22 is connected via the passage 62 formed by the inner wall of the tube 50 leading to the fluid pressure outlet 19 in the central housing 25.

Thus, the relay valve apparatus includes two relay valves which are made up of two separate end members serving as identical housing covers 1 and 28, along with a central housing 25 which accommodates both relay valves. Accordingly, the two relay valves are formed by a common intermediate housing member and two separate end covers.

The first double seat valve 12,13 / 60,8 of the first relay piston 7 and the second double seat valve 42, 46, 39, 40 of the second relay piston 30 are arranged in such a manner that their direction of movement is opposite to one another. Thus, the outlet opening of the one outlet valve is directed toward the outlet opening of the other outlet valve.

It will be appreciated that instead of dividing the outlet chambers 18, 22 into two sectional chambers 18 and 22, there may be a single outlet chamber in which case the baffle or partition 21 is omitted. In such a case, it would be appropriate to provide other suitable means which would prevent any interaction between the two relay pistons caused by the exiting fluid pressure, namely, so that the fluid pressure flowing out of the outlets of the respective double seat valves is conveyed directly to the fluid pressure outlet 19.

If no precautionary measure is taken, then during the exhausting or venting operation there could be an interaction between the two relay valves which could affect either one or both of them by the formation of dynamic pressure.

The fluid pressure input chambers 52, 49 may consist of a common chamber located within the housing 25 for each of the double seat valves, or of two separate fluid pressure input chambers.

The housing 25 is appropriately arranged to be in the vicinity of the two working chambers 55 and 30, which are defined by the two housing end covers 1 and 28, respectively. The housing 25 has fluid pressure outlets 53 and 47 which can be conveniently connected to suitable consumers and to the corresponding working chambers 55 and 30. The two tubular bodies 15 and 48 are designed as double valve bodies and are appropriately located coaxially to one another, which lie one behind the other in the direction of their longitudinal axes between the two relay pistons 7 and 29 in the relay housing 25.

As described above, the two outlet valves of the two double seat valves are connected to one another by means of a common outlet passage which is connected with the fluid pressure outlet 19. The outlet passage is thereby designed as a tubular member 50. The ends of the outlet passage corresponding to the double seat valves are used to provide sealed guidance for the double valve bodies of the double seat valves.

The function and operation of the relay valve apparatus described above will now be explained in greater detail.

In practice, each of the two control inputs 57 and 37 of the relay valve apparatus is appropriately connected by means of a valve apparatus to a fluid control pressure source, while the fluid pressure input 51 is also connected with a fluid pressure supply reservoir.

The pressure in the supply reservoir is conveyed to the input chambers 52 and 49.

When the control chamber 6 of the first relay valve and the control chamber 31 of the second relay valve are not pressurized, the inlet valve 12, 13 of the first double seat valve and the inlet valve 42, 46 of the second double seat valve are both closed. At this time, the outlet valve 8, 60 of the first double seat valve and the outlet valve 39, 40 of the second double seat valve are in the open position. The outlet chambers 18, 22 are connected to the passageway 62, which leads to the pressure outlet 19 of the housing 25 and, in turn, to the connection tube 20. Thus, the first working chamber 55 and the second working chamber 30 of the relay valve apparatus are placed in communication with the atmosphere.

Now, if fluid control pressure is admitted and applied to the first control chamber 6 as well as to the second control chamber 31, the pressure builds up in the first control chamber 6 to cause a movement of the first relay piston 7 toward the first working chamber 55.

At the same time, the pressure build-up in the second control chamber 31 causes a movement of the second relay piston 29 toward the second working chamber 30.

Thus, the outlet valve 8, 60 of the first double seat valve and the outlet valve 39, 40 of the second double seat valve are moved to their closed positions. Now, when the two relay pistons 7 and 29 move further in their opposite directions toward the corresponding working chambers 55 or 30, respectively, the inlet valve 12, 13 of the first double seat valve and the inlet valve 42, 46 of the second double seat valve will be moved to their open positions. Thus, the supply pressure in the pressure input chambers 52, 49 flows through the opened inlet valve 12, 13 of the first double seat valve into the first working chamber 55 and through the open inlet valve 42, 46 of the second double seat valve into the second working chamber 30 of the relay valve apparatus.

The fluid pressure flows from the first working chamber 55, through the first pressure output 53 to the first consumer and the fluid pressure flows from the second working chamber 30, through the second pressure medium output to the second consumer.

If the pressure in the first consumer and, in turn, in the first working chamber 55 increases to the point where the force of the pressure in the first working chamber 55 overcomes the force in the opposite direction exerted by the pressure in the first control chamber 6 on the relay piston 7, then the inlet valve 12, 13 of the first double seat valve moves to its closed position. Thus, a final position is reached.

If the pressure in the second consumer and, in turn, the pressure in the second working chamber 30 increases to the point where the force of this pressure is in equilibrium with the opposite force acting on the relay piston 29 from the pressure in the second control chamber 31, the inlet valve 42, 46 of the second double seat valve moves into the closed position. Accordingly, a final position of the second relay valve is reached.

If the valve apparatus preceding the relay valve apparatus is reversed, then the first control chamber 6 and the second control chamber 31 will be vented or exhausted. On account of the force of the pressure in the first working chamber 55 and in the second working chamber 30, the first relay piston 7 and the second relay piston 29 are moved toward the corresponding first control chamber 6 and second control chamber 31, respectively.

The outlet valve 60, 8 of the first double seat valve and the outlet valve 39, 40 of the second double seat valve of the relay valve apparatus move into the open position. Now, when the first outlet valve 60, 8 is opened, the first working chamber 55 and, in turn, the first consumer are vented into the first sectional chamber 18 of the outlet valve 8, 60 through the passage 62 and through the pressure outlet 19 to the atmosphere. Likewise, the second working chamber 30 and, in turn, the second consumer are vented via the outlet valve 39, 40 of the second double seat valve into the second partial chamber 22, and from the latter through the passage 62 and through the pressure outlet 19 to atmosphere.

The valve equipment preceding the relay valve apparatus may be provided with two electromagnet valves which can be controlled either simultaneously or independently of one another at different times. Such a control of the first control chamber 6 and of the second control chamber 31 by means of electromagnet valves operating separately from one another is conceivable when this valve equipment is used in the anti-lock regulation system for vehicle brake units.

The two relay pistons 7 and 29 of the relay valve apparatus can have effective surface areas which are the same size, or they can also have effective surface areas which are different, depending upon the desired functions and the intended use of the relay valve apparatus. In other words, the first relay piston 7 can have effective surfaces which have dimensions which are different from those of the second relay piston 29.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically described embodiment of the invention may be made by those persons skilled in the art without departing from the spirit and scope of the invention as set forth in the appended claims.

We claim:

1. A relay valve apparatus for use in an anti-lock regulation system for vehicle brake units comprising:
   (a) a first double seat valve having a first inlet valve for establishing communication of a first working chamber with a fluid pressure input chamber, and having a first outlet valve for establishing communication of the first working chamber with a first outlet chamber which is in communication with the atmosphere;
   (b) the first double seat valve having a first relay piston which is connected to a first source of control pressure;
   (c) a second double seat valve having a second inlet valve for establishing communication of a working chamber with a fluid pressure input chamber, and having a second outlet valve for establishing communication of the second working chamber with a second outlet chamber which is in communication with the atmosphere;
   (d) the second double seat valve having a second relay piston which is connected to a second source of control pressure;
   (e) the first and second double seat valves and the relay pistons are located one behind the other in the direction of their longitudinal axes, so that the first and second double seat valves are located between the relay pistons;
   (f) the first outlet chamber of the first double seat valve and the second outlet chamber of the second double seat valve empty into a common pressure outlet passage leading to the atmosphere; and
   (g) a deflector located between the first and second outlet chambers for preventing interaction between the first and second relay pistons when fluid pressure is exhausted through the common outlet passage to atmosphere.

2. The relay valve apparatus, according to claim 1, wherein the first and second double seat valves and the two relay pistons are concentric with one another.

3. The relay valve apparatus, according to claim 1, wherein the first outlet chamber of the first double seat valve and the second outlet chamber of the second double seat valve join a chamber which is common to both of the double seat valves.

4. The relay valve apparatus, according to claim 1, wherein the first and second outlet valves are connected with one another through a connection passage which is connected with the fluid pressure outlet.

5. The relay valve apparatus, according to claim 4, wherein the connection passage is formed by a tubular member.

6. The relay valve apparatus, according to claim 5, wherein the tubular member functions as a guide means for the first and second double seat valves.

7. The relay valve apparatus, according to claim 1, wherein the first and second double seat valves take the form of tubular bodies.

8. The relay valve apparatus, according to claim 1, wherein the first and second outlet chambers are formed by a tube which has passage on its side facing a fluid pressure outlet, and the tube is designed and oriented in a housing of the relay valve apparatus so that it serves as a wall which separates the first and second outlet chambers from the fluid pressure input chambers.

9. The relay valve apparatus, according to claim 1, wherein the first and second double valve seats are rigidly mounted in the housing and take the form of annular inserts which are fastened to the housing.

10. The relay valve apparatus, according to claim 8, wherein the outlet passage is essentially a linear member, and the deflector is located in the linear member and essentially transverse to the longitudinal axis of the linear member, and the deflector is located in the vicinity of the outlet passage and the fluid pressure outlet.

11. The relay valve apparatus, according to claim 10, wherein the deflector is designed as a plate-like element which is located in the tube and is essentially transverse to the longitudinal axis of the tube.

12. The relay valve apparatus, according to claim 11, wherein the housing is open on two ends and has a fluid pressure input and a fluid pressure outlet and wherein the ends of the housing are closed by a pair of housing covers.

13. The relay valve apparatus, according to claim 12, wherein the housing covers are identical.

14. The relay valve apparatus, according to claim 13, wherein the housing covers and relay pistons, respectively, are guided in a sealed manner, and the corresponding control chambers are located in the corresponding control connection.

15. The relay valve apparatus, according to claim 14, wherein the housing contains the first and second double seat valves.

16. The relay valve apparatus, according to claim 15, wherein the housing is enclosed by the two housing covers in the vicinity of the first and second working chambers.

17. The relay valve apparatus, according to claim 16, wherein the housing has two fluid pressure outputs which are connectable to consumers and which correspond to the first and second working chambers.

18. The relay valve apparatus, according to claim 1, wherein the first fluid pressure input chamber corresponding to the first double seat valve and the second fluid pressure input chamber corresponding to the second double seat valve are formed by a common fluid pressure input chamber.

* * * * *